Figure 1:
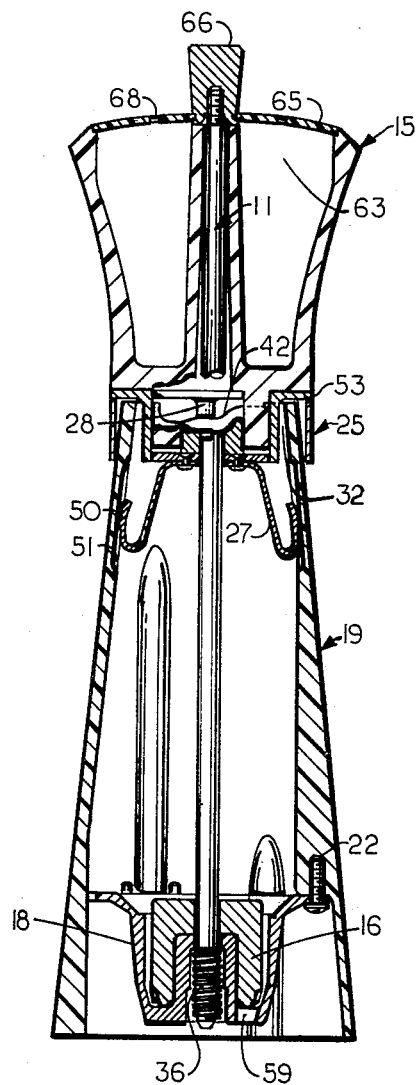

Feb. 2, 1965  W. E. BOUNDS ETAL  3,168,256
PEPPER MILL
Filed May 2, 1963  2 Sheets-Sheet 1

INVENTORS
WILLIAM E. BOUNDS
ELMER S. MORRIS
CARL A. SUNDSTROM
BY Edward A. Sokolski
ATTORNEY

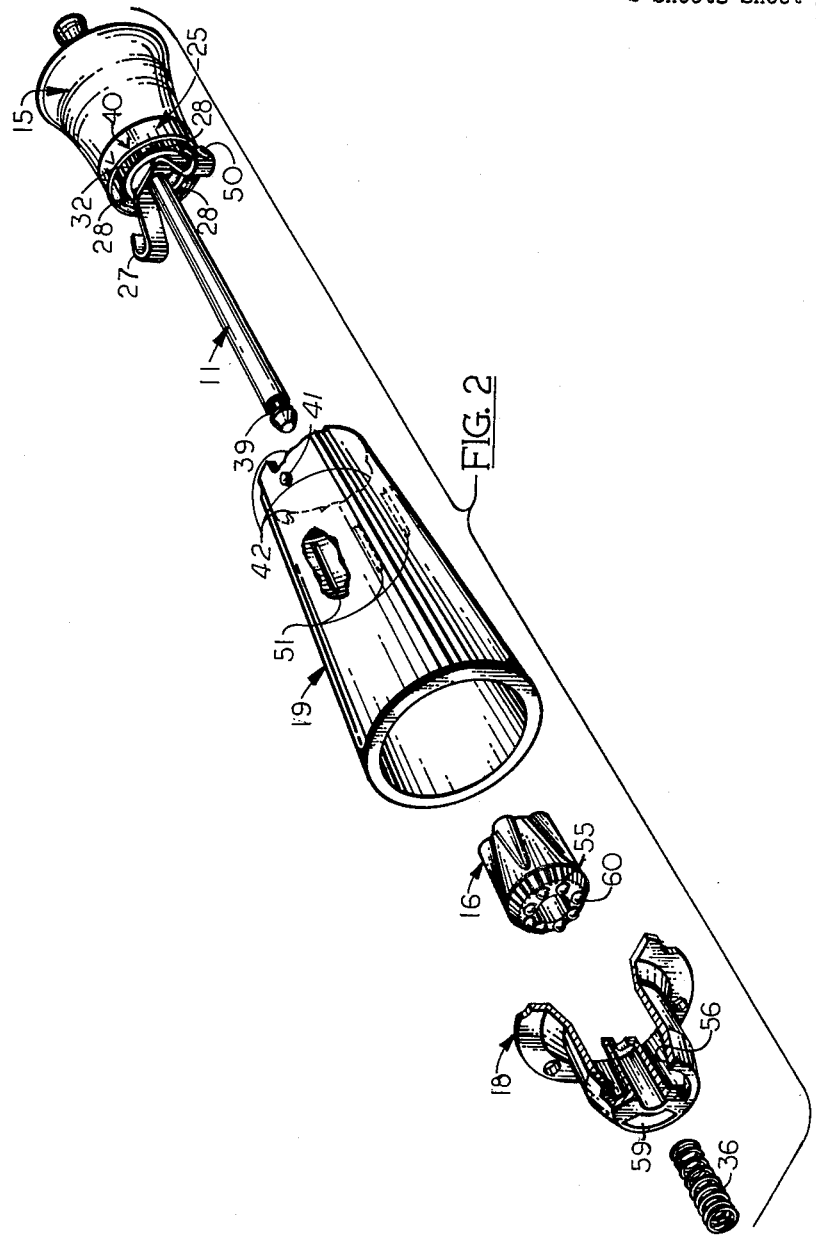

3,168,256
PEPPER MILL
William E. Bounds and Elmer S. Morris, Manhattan Beach, and Carl A. Sundstrom, Palos Verdes, Calif., assignors to William E. Bounds Associates, Manhattan Beach, Calif., a partnership
Filed May 2, 1963, Ser. No. 277,631
10 Claims. (Cl. 241—168)

This invention relates to a pepper mill and more particularly to such a device which can be selectively set to grind pepper to one of several consistencies.

A pepper mill is almost always used by a gourmet in seasoning his food to assure the optimum flavoring results. Generally, in the pepper mills of the prior art, the mill must be set by an internal adjustment to produce pepper particles of a particular desired size. However, it may be desired for different purposes to produce different size granules. With the pepper mills of the prior art, it is necessary to make an internal adjustment on the mill to appreciably change the size of the granules produced. Such an adjustment is entirely impractical during a meal, and therefore the pepper mill is generally pre-set to grind the granules to a compromise size which is less than ideal for all desired uses. Most of the pepper mills of the prior art, also are incapable of grinding the pepper to a very fine consistency.

The device of this invention overcomes the aforementioned shortcomings of prior art devices in providing means for selectively setting the pepper mill to grind the pepper to one of several pre-selected consistencies. For the "fine" position, means are provided in the device of the invention to mash the granules to produce an end result of exceptionally fine consistency.

In the device of the invention, a grinder head is fixedly attached to a rotatable shaft for movement relative to a fixed mating grinding receptacle. The grinding receptacle is fixedly attached to support means on which appropriate cam surfaces are formed to define several distinct positions each establishing a different separation between the grinding surfaces. Cam means which are connected to a rotatable selector ring are positioned on the mating cam surfaces to set the rotatable grinder head a predetermined distance from the stationary grinding receptacle. In the position for the finest grind, the grinding action involves both rotary and reciprocal motion. Thus, the size of the granules produced by the mill is determined by the position of the selector ring. One of several size granules can, in this manner, be selected by the operator of the mill.

It is therefore an object of this invention to provide an improved pepper mill.

It is a further object of this invention to provide a pepper mill in which various size pepper granules can be selectively produced.

It is another object of this invention to enhance the versatility of operation of a pepper mill.

It is still another object of this invention to provide a pepper mill capable of finer grinding action than prior art devices.

Other objects of this invention will become apparent from the following description taken in connection with the accompanying drawings of which FIG. 1 is a cross sectional view of a preferred embodiment of the device of the invention, and FIG. 2 is an exploded perspective view of the preferred embodiment illustrated in FIG. 1.

Referring now to the figures, shaft 11 is connected to top piece 15 of the shaker so that it rotates therewith by means of nut piece 66. When nut piece 66 is tightened, the center of the top piece is force fitted to the shaft. When nut piece 66 is removed, top piece 15 can be removed from the shaft to permit the filling of the interior of encasing support member 19 with peppercorns. Fixedly attached to shaft 11 by any suitable means is grinder head 16. Grinding receptacle 18 is fixedly attached to the inside of support member 19, which forms a case, by means of screws 22 (see FIG. 1). Selector ring 25 has a spring member 27 fixedly attached thereto and has three cams 28 spaced equally around the inside of channel 32 which is formed therein. Rod 11 fits through the central portion of selector ring 25 and is rotatable relative thereto. Rod or shaft 11 is held to grinding receptacle 18 for rotatable motion relative thereto by means of spring 36. The ends of spring 36 are flattened to effectively provide washer surfaces with one of these flattened ends fitting into groove 39 on shaft 11 to hold the shaft in the desired position. This one end of the spring is tapered to assure that it does not slip out of groove 39 once it is set in place.

Selector ring 25 is rotated to bring one of indicator pointers 40 opposite indicator dot 41. The indicator pointers may be labeled, for example, "Coarse," "Medium," and "Fine." As ring 25 is rotated, cams 28 slide on mating cam surfaces 42. When ring 25 reaches a position where one of the indicator arrows 40 is opposite indicator dot 41, detent ridges 50, which are on the ends of the arms of spring 27 enter detent grooves 51 formed in the wall of support member 19 thereby holding the ring in this position by virtue of the urging of spring 27. In view of the fact that the top wall 53 of ring member 25 abuts against one of the bottom walls of rotatable top piece 15, the vertical position of this top piece and shaft 11, which is connected thereto, is determined by the relative vertical position of ring member 25. Thus, when cams 28 are riding on the center of cam surfaces 42 as shown in FIG. 1, rod 11 is at an intermediate vertical position relative to the case. When the cams are to the left of their indicated position riding on a lower point on cam surfaces 42 or to the right on a higher point thereof, the shaft is set to a lower or higher vertical position respectively.

In view of the fact that grinder head 16 is fixedly attached to the shaft, such vertical positioning of the rod will control the relative position of grinder head 16 to grinding receptacle 18 along the the axis of rod 11. Thus, the vertical spacing between grinder head 16 and grinding receptacle 18 can be controlled by the rotation of ring 25. With the cam 28 in the position indicated in FIG. 1, the grinder head is set to produce medium size granules, while when it is to the left of where shown it will produce fine granules and when to the right of where shown coarse granules. This is because, as can readily be seen, with the changing of the vertical positioning between rotatable grinder head 16 and grinding receptacle 18, the grinding space between these two members is changed with a resultant variation in grinding action.

The grinding action is achieved between opposing surfaces 55 and 56 on rotatable grinder head 16 and grinding receptacle 18 respectively. The pepper particles are forced out through apertures 59 in the bottom of the mill with the grinding action. When the mill is in the "fine" position, i.e., when the grinding surfaces 55 and 56 are closest together, dimples 60 which are separated by a distance greater than the width of the walls between apertures 59, alternately abut against the surfaces adjacent to apertures 59 and fall into these apertures resulting in a reciprocating motion along the axis of shaft 11. This action tends to more efficiently force the finer granules out of the mill and results in reciprocating as well as rotary grinding action. Thus, finer grinding is achieved than in prior art devices.

Grinding action is achieved by rotating top piece 15.

This rotates shaft 11 and along with it grinder head 16 to produce the desired grinding action between surfaces 55 and 56. Top piece 15 has a cavity 63 formed therein which may be utilized to hold salt. Cover plate 65 which is removably attached to shaft 11 by means of nut piece 66 has a series of apertures 68 therein and thus may be utilized to form a salt shaker.

The device of this invention thus provides a simple yet highly effective paper mill in which the size of the granules produced may be instantaneously determined by means of a selector. In this manner, the effectivity of pepper grinding is greatly enhanced to provide for the user the size granule that he desires for each particular purpose.

While the invention has been described and illustrated in detail, it is to be clearly understood that this is intended by way of illustration and example only and is not to be taken by way of limitation, the spirit and scope of this invention being limited by the terms of the following claims.

We claim:

1. In a pepper mill,
support means,
a first grinding member mounted on said support means for rotation relative thereto,
a second grinding member fixedly mounted on said support means, said second grinding member being positioned for grinding action in conjunction with said first member,
means for rotating said first grinding member relative to said second grinding member, and
selector means mounted for rotation relative to both said first grinding member and said support means for alternatively positioning the grinding surfaces of said first grinding member at one of several predetermined distances from the grinding surfaces of said second grinding member,
said selector means comprising a selector ring having at least one cam attached thereto, said support means having at least one cam surface formed thereon having several distinct steps, each of said steps defining a predetermined grinding position, said cam sliding along said cam surface with rotation of said ring.

2. The device as recited in claim 1 wherein is additionally included a flat spring fixedly attached to said selector ring, said spring having arms extending out therefrom and abutting against said support means.

3. In a pepper mill,
support means,
a first grinding member mounted on said support means for rotation relative thereto,
a second grinding member fixedly mounted on said support means, said second grinding member being positioned for grinding action in conjunction with said first member,
means for rotating said first grinding member relative to said second grinding member,
one of said grinding members having a plurality of projections spaced around one surface thereof, the other of said grinding members having a plurality of spaced apertures formed in a surface thereof opposite said one surface, whereby when said grinding members are rotated relative to each other, said projections alternately fall into said apertures and abut against said surface opposite said one surface to produce a reciprocating motion between said grinding members, and
selector means mounted for rotation relative to both said first grinding member and said support means for alternatively positioning the grinding surfaces of said first grinding member at one of several predetermined distances from the grinding surfaces of said second grinding member.

4. A pepper mill comprising
a casing, said casing having a cam surface on one edge thereof, said cam surface having a plurality of distinct step portions,
a grinder receptacle mounted within said casing and attached thereto, said grinder receptacle being mounted in said case near the edge thereof opposite said one of said edges on which said cam surface is formed,
a top portion,
a shaft, one end of such shaft being connected to said top portion,
a grinder head fixedly attached to said shaft near the other end thereof, said grinder head being positioned adjacent to said grinder receptacle,
a selector ring mounted on said shaft for rotation relative thereto, said selector ring having a cam thereon, said cam abutting against the cam surface formed in said casing, and
a flat type spring having at least two arms resiliently abutting against the inner wall of said case, said spring being fixedly attached to said selector ring,
whereby when said selector ring is rotated from one distinct position to another the spacing between the grinding surfaces of said grinder head and said grinder receptacle is changed.

5. The device as recited in claim 4 wherein said grinder head is concentric with said grinder receptacle.

6. A pepper mill comprising
a casing, said casing having a cam surface on one edge thereof, said cam surface having a plurality of distinct step portions, said casing further having a plurality of detent grooves on the inner wall thereof,
a grinder receptacle mounted within said casing and attached thereto, said grinder receptacle being mounted in said casing near the edge thereof opposite said one of said edges on which said cam surface is formed,
a top piece,
a shaft, one end of such shaft being connected to said top piece,
a grinder head fixedly attached to said shaft near the other end thereof,
spring means for attaching said other end of said shaft to said grinder receptacle for rotation relative thereto, the grinding surfaces of said grinder head being held in close proximity to inner surfaces of said grinding receptacle,
a selector ring mounted on said shaft for rotation relative thereto, said selector ring having a cam thereon, said cam abutting against the cam surface formed in said casing,
a flat type spring having at least two arms, said arms resiliently abutting against the inner walls of said casing, said spring being fixedly attached to said selector ring, said spring further having detent ridges on the arm portions thereof abutting against said casing, said detent ridges being adapted for mating engagement with the detent grooves, said selector ring having a plurality of distinct positions wherein the detent ridges in said flat spring arms are engaged with a separate pair of detent grooves in said casing, each of said distinct selector ring positions corresponding to an engagement between said cam and one of the steps in said cam surface,
said top piece having a chamber formed therein and a cover having apertures therein removably attached to said top piece,
whereby when said selector ring is rotated from one distinct position to another, the spacing between the grinding surfaces on said grinder head and said grinder receptacle is changed.

7. The pepper mill as recited in claim 6 wherein said grinder head has a plurality of dimples formed along an end thereof proximate to the grinding surface of said grinder receptacle.

8. The pepper mill as recited in claim 6 wherein said casing has a plurality of similar cam surfaces along said one edge thereof and said detector ring has a plurality of cams thereon, each of said cams being positioned for mating engagement with one of said cam surfaces.

9. The pepper mill as recited in claim 6 wherein the grinding surfaces on said grinder head and said grinder receptacle have a truncated conical shape, the grinding surfaces of said grinder head having serrations therein.

10. The pepper mill as recited in claim 6 wherein said shaft has a groove formed in the other end thereof, one end of said spring means being fitted into said groove.

References Cited by the Examiner
UNITED STATES PATENTS

| | | | |
|---|---|---|---|
| 1,327,385 | 1/20 | Hammer | 241—168 |
| 1,965,919 | 7/34 | Bieger et al. | 241—101 |
| 2,318,911 | 5/43 | Zweber et al. | 241—168 |
| 2,688,448 | 9/54 | Lenz | 241—168 |
| 2,974,887 | 3/61 | Grandinetti | 241—168 X |

WILLIAM W. DYER, Jr., *Primary Examiner.*